Sept. 23, 1969　　　　　　　G. V. ALLEN　　　　　　　3,469,069
ELECTRIC WELDING TORCH

Filed Jan. 12, 1967　　　　　　　　　　　　　　3 Sheets-Sheet 1

INVENTOR
GILBERT V. ALLEN
BY
Charles C. Wells
ATTORNEY

INVENTOR
GILBERT V. ALLEN
BY
ATTORNEYS

3,469,069
ELECTRIC WELDING TORCH
Gilbert V. Allen, Athens, Ala., assignor to the United States of America as represented by the Administrator of the National Aeronautics and Space Administration
Filed Jan. 12, 1967, Ser. No. 608,944
Int. Cl. B23k 9/12, 9/16
U.S. Cl. 219—130     3 Claims

ABSTRACT OF THE DISCLOSURE

An electric welding apparatus that includes a welding head having a cylindrical casing at one end thereof that forms an inert gas shield. A fixed electrode is mounted in a canted and offset position in the casing by means of a conductive collar mounted to the interior surface of the casing. Filler wire from a feeder mechanism is fed through the center of the welding head to a weld puddle. Cooling water and inert shielding gases are routed to the weld area through conduits in the welding head.

---

The invention described herein was made by an employee of the United States Government and may be manufactured and used by or for the Government for governmental purposes without the payment of any royalties thereon or therefor.

This invention relates in general to welding devices. More particularly this invention relates to a welding device featuring an offset canted electrode and a center fed filler rod that permits feeding of the filler rod directly into the center of a weld puddle.

The aerospace industry requires quality spot welding techniques that produce spot welds which conform to rigid specifications and can be consistently reproduced without depending upon the skill of an operator. Investigations have revealed spot welding techniques to be the most satisfactory method of joining miscellaneous small component parts to large bulkheads and cylindrical skin sections of space vehicles. However, spot welding techniques and devices previously available have not been adequate to consistently produce welds of the required quality. For example, resistance spot welding techniques are unsatisfactory due to physical limitations of size and non-portability of the equipment. Further, in welding apparatus available heretofore the filler rod used in such apparatus has been mounted in a canted position so as to cause the weld puddle to spill over the sides of a weld crater as it is being filled with filler rod, giving rise to nonsymmetrical and inconsistent spot welds. Irregular welds were inherent in the above filler rod arrangement in that the weld crater is fed from one side which causes that one side of the spot weld to be higher than the other. Electrodes, too, were centrally mounted and often contaminated by the puddle and filler rod due to excursions made by the electrode into the weld crater.

The present invention avoids these difficulties by employing an offset canted electrode and by center feeding a filler rod through the central portion of the welding device directly into the center of the weld area. The weld crater is filled more evenly and results in a spot weld having improved characteristics in that weld nugget diameters are consistent and the exposed surfaces thereof are smooth and regular. Further, electrode contamination is eliminated by the present invention since the electrode is fixed and never penetrates the weld puddle as was the case in prior devices incorporating variable position electrodes and canted filler rod positioning.

The offset canted position of the electrode employed in this invention allows the arc to strike the area of the metal to be welded to form a crater. Electrode height is not critical in that during the welding operation the area adjacent the weld becomes ionized and forms a current path from electrode to filler rod to workpiece. Penetration through an interface is achieved with the present invention by a driving or gauging action of the filler rod, whereas with conventional systems previously mentioned, such action could be achieved only by using very high currents. This action essentially cleans out the interface, it being a source of contaminating oxides and atmospheric gases, and the crater is filled from the center with clean filler metal to result in better fusion at the interface and thus a better quality weld.

It is therefore an object of this invention to provide an improved welding apparatus capable of consistently producing quality spot welds.

A further object of the present invention is to provide a welding device employing a center fed filler rod and an offset electrode.

Other objects and attendant advantages of the invention will become more apparent when considering the following detailed description in conjunction with the attached drawings wherein.

Figure 1:
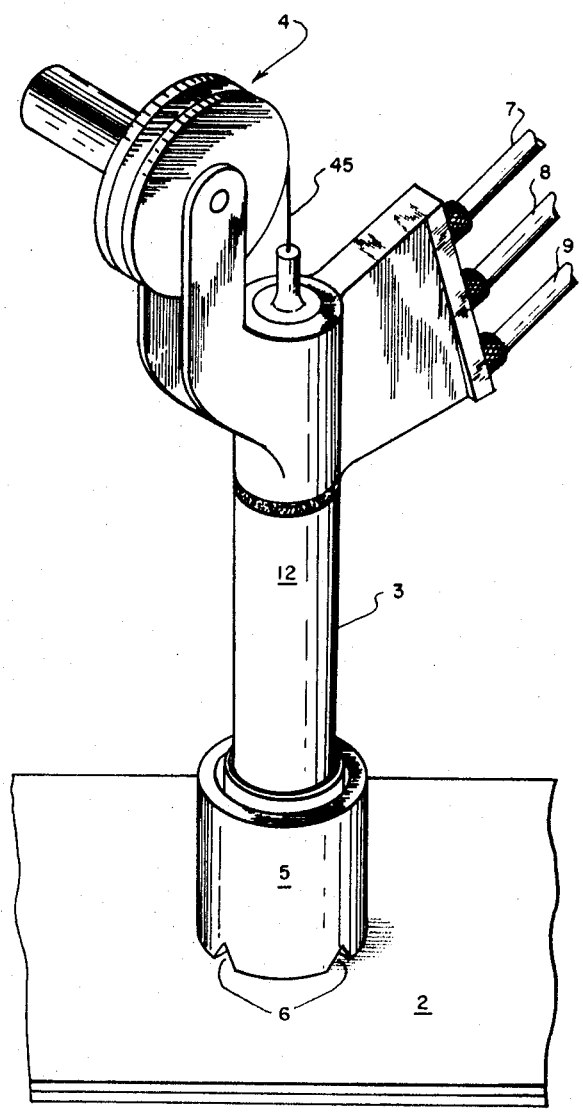
FIGURE 1 is a perspective view of a welding device in position for spot welding.

Referring to FIGURE 1 of the drawings, a welding device is shown in position over a workpiece 2 to be spot-welded. The welding device includes a welding head 3 having a filler wire feeding mechanism 4 mounted on the upper end thereof and an inert gas shield 5 attached to the other end thereof. The gas shield has notches 6 formed on the lower end thereof which permits the area enclosed by the shield to be purged of air by the inert gas supplied to the interior of the shield. The inert gas is supplied to the weld area via gas line 7 connected to the welding head and internal passageways, discussed hereafter, provided in the welding device. Combined power and water outlet line 8 and water input line 9 are connected to the welding device to provide electrical power and cooling water thereto. The workpiece is illustrated herein as two plates being spot welded together; however, the workpiece could take other forms.

Figures 2, 3:
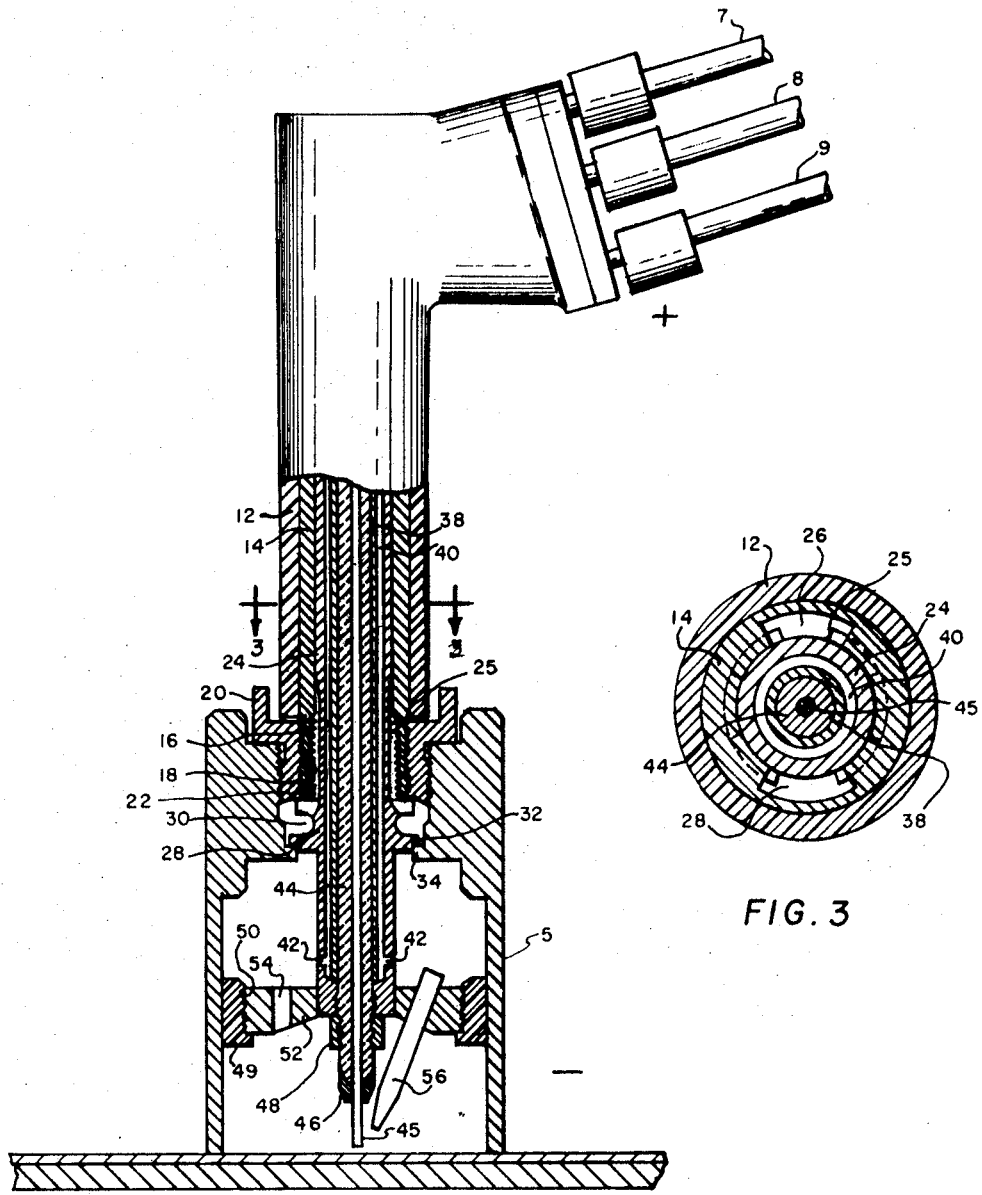
FIGURE 2 is an elevation view, partially cross-sectioned, of a welding device constructed in accordance with the invention.
FIGURE 3 is a view in cross-section taken along lines 3—3 of FIGURE 2.

Referring now to FIGURES 2 and 3 of the drawing, there is illustrated a sectional view of a welding head that includes a circular outer housing 12 of composition material having a concentric copper tube 14 mounted therein. Tube 14 includes threaded surfaces 16 and 18 that extend below outer housing 12. A shield adapter 20 mounted on tube 14 includes a threaded portion 22 that threadably engages threaded portion 16 formed on tube 14. A second copper tube or sleeve 24 is positioned within copper tube 14. Copper sleeve 24 has a plurality of threaded portions 25 formed thereon that engage threaded portion 18 of tube 14 when copper tube 24 is inserted therein. Copper sleeve 14 has longitudinal grooves 26 and 28 (see FIGURE 2) milled therein to form water passageways through which cooling water is circulated to remove heat generated during a welding operation.

Referring again to FIGURE 2, it will be seen that tube 24 has an enlarged portion 28 formed near the lower end thereof. Enlarged portion 28 has a circular channel 30 formed therein and also a shoulder 32 that abuts against a sealing surface or shoulder 34 formed on inert gas shield 5. Channel 30 forms a passageway in communication with slots or grooves 26 and 28 formed in copper tube 14 and thus provides a path through which cooling water can be circulated. Normally an appropriate seal will be positioned between shoulders 32 and 34 to prevent the escape of cooling water into the welding area. Cooling water is circulated through the welding head by feeding water from input water line 9 into passageway 26 via suitable conduits (not shown), through passageway 26 to channel 30 and back up through passageway 28 to water outlet line 8.

A metallic sleeve 38 is mounted within copper tube 24 but is spaced therefrom so as to form an annular passageway 40 for feeding of inert gases to the weld area. Tube 24 has a plurality of openings, as indicated at 42, which permits gas to escape from chamber 40 into the weld area. An inert gas such as helium is supplied to the interior of gas shield 5 via gas line 7 connected to passageway 40 by suitable conduits (not shown) where it is diffused through openings 42.

A tubular guide sleeve 44 is mounted in tube 38 and is in close contact therewith. Sleeve 44 has a central opening therein through which a filler wire 45 from feed mechanism 4 can be fed into the weld area. Sleeve 44 is composed of an insulator material and functions to guide the filler rod to the weld puddle and to insulate the filler rod from the remainder of the welding device. A copper guide tip 46 is attached to the lower end of sleeve 44 and an annular fiberglass insulator 48 is attached to sleeve 44 just above the copper guide tip.

Inert gas shield 5 has a ring member 49 attached to an interior surface thereof in a position above the weld puddle area. Ring member 48 has a threaded portion 50 formed on the inwardly facing surface thereof for mounting an annular conducting collar 52. Collar 52 is supported by attachment to the lower end of tube 24 and threadable engagement with ring 48. The conducting collar has a plurality of openings 54 formed therein that permits the diffusion of gas to the immediate weld area. A tungsten electrode 56 is mounted in the conducting collar in a fixed position, offset from center, and canted relative to the filler rod, the particular position of the electrode offering many advantages as discussed above.

Figure 4A:
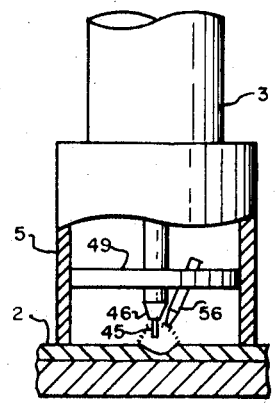
FIGURES 4A through 4D are a schematic illustration of a spot welding sequence using the invention.
Figure 4C:
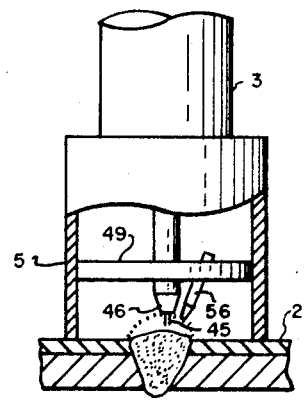
Figure 4B:
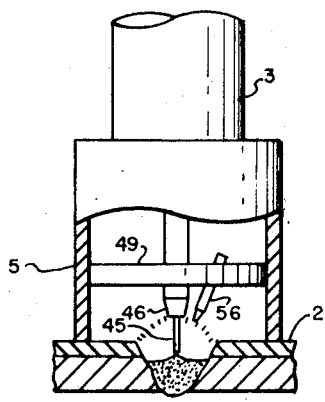
Figure 4D:
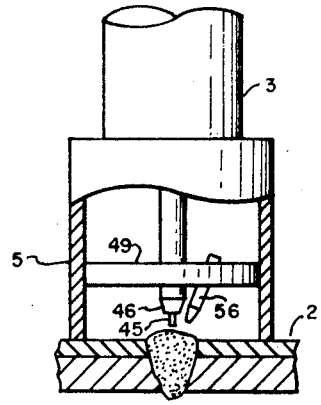

The operation of the invention will now be discussed with reference to FIGURES 4a–4d. As illustrated in FIGURE 4a, operation is initiated by admitting inert gas to the weld area and applying a current to electrode 56 via copper tube 24 connected by suitable connections (not shown) to power line 8. Preheating of the workpiece occurs when the arc strikes the area of the workpiece, and a crater is formed in the workpiece, as illustrated in FIGURE 4b. Filler wire is then fed into the crater as the tungsten electrode melts the wire and the crater is filled. FIGURE 4b shows the crater partially filled. Cooling water is, of course, being circulated through the welding head during the operation. When the crater is filled, as illustrated in FIGURE 4c, the feed of filler rod is stopped and current to the electrode is decreased. FIGURE 4d illustrates a solidified weld nugget.

It will be apparent from the foregoing description of a preferred exemplary embodiment of the invention that a new and novel welding apparatus has been disclosed that is capable of making improved welds. It is also apparent that there will be many changes and modifications which can be made to the invention by those skilled in the art without departing from the spirit and scope of the invention as defined in the claims appended hereto.

What is claimed is:

1. An electric welding device that includes a welding head adapted to be positioned over a workpiece, said welding head comprising:
   means for feeding a filler wire through the center of said welding head to the center of an area to be welded on the workpiece;
   a fixed electrode mounted in said welding head in a canted position relative to said filler wire, whereby one end of said electrode is adjacent one end of said filler wire in a position immediately above the workpiece during a welding operation;
   a cylindrical casing at one end of said welding head which surrounds the welding area and functions as an inert gas shield;
   a conducting collar mounted to the interior surface of said casing;
   said fixed electrode being mounted in said collar in a fixed and canted position relative to said filler wire;
   a ring member attached to the inside surface of said cylindrical casing for supporting said conducting collar, said ring member being composed of an insulator material and having a threaded interior surface; and
   said conducting collar having a threaded exterior portion that engages the threaded interior surface of said ring member.

2. The welding device recited in claim 1 wherein said welding head further includes:
   a tubular guide member of insulator material centrally mounted in said welding head; and
   said tubular guide member having an opening extending therethrough wherein said filler wire can be guided through said welding head to the center of a weld area.

3. The welding device recited in claim 2 wherein said welding head further includes circular diffusion holes in said conducting collar through which inert gas can diffuse and surround the weld area.

References Cited

UNITED STATES PATENTS

| | | | |
|---|---|---|---|
| 2,868,954 | 1/1959 | Skinner et al. | 219—130 |
| 2,868,956 | 1/1959 | Lobosco | 219—130 X |
| 2,892,925 | 6/1959 | Butterfield et al. | 219—130 X |

JOSEPH V. TRUHE, Primary Examiner

J. G. SMITH, Assistant Examiner

U.S. Cl. X.R.

219—75